United States Patent [19]

Aizawa

[11] Patent Number: 6,073,191
[45] Date of Patent: Jun. 6, 2000

[54] I/O UNIT AND DISTRIBUTION BOARD FOR NUMERICAL CONTROL APPARATUS

[75] Inventor: Yasuharu Aizawa, Minamitsuru-gun, Japan

[73] Assignee: Fanuc Ltd., Yamanishi, Japan

[21] Appl. No.: 08/849,173

[22] PCT Filed: Oct. 9, 1996

[86] PCT No.: PCT/JP96/02939

§ 371 Date: May 30, 1997

§ 102(e) Date: May 30, 1997

[87] PCT Pub. No.: WO97/14083

PCT Pub. Date: Apr. 17, 1997

[30] Foreign Application Priority Data

Oct. 9, 1995 [JP] Japan ..................... 7-286403

[51] Int. Cl.[7] ............ G05B 19/414; G06F 13/10
[52] U.S. Cl. ................. 710/63; 710/62; 710/64; 710/72; 710/102
[58] Field of Search .................. 395/882, 282; 361/627; 710/63, 62, 64, 72, 102

[56] References Cited

U.S. PATENT DOCUMENTS

| | | |
|---|---|---|
| 4,510,565 | 4/1985 | Dummermuth .................. 364/136 |
| 4,533,990 | 8/1985 | Takada et al. . |
| 5,000,692 | 3/1991 | Taniguchi et al. . |
| 5,315,071 | 5/1994 | Tanimichi ..................... 174/254 |
| 5,388,060 | 2/1995 | Adams, Jr. et al. ............. 364/578 |

FOREIGN PATENT DOCUMENTS

| | | |
|---|---|---|
| 0 490 864 | 6/1992 | European Pat. Off. . |
| 4-54607 | 2/1992 | Japan . |
| 5-80826 | 4/1993 | Japan . |

OTHER PUBLICATIONS

Communication from the European Patent Office dated Dec. 1, 1999.

Primary Examiner—Thomas C. Lee
Assistant Examiner—Ilwoo Park
Attorney, Agent, or Firm—Staas & Halsey LLP

[57] ABSTRACT

A distribution board includes wiring and connectors removably attaching a plurality of I/O units. These I/O units include transmitter-receiver units. When the I/O units are attached to one or more of the connectors on the distribution board, the attached I/O units and the wiring provided on the distribution board are connected to one another.

10 Claims, 3 Drawing Sheets

I/O UNIT AND DISTRIBUTION BOARD FOR NUMERICAL CONTROL APPARATUS

FIELD OF THE INVENTION

The present invention relates to an improvement of I/O units and a distribution board for numerical control apparatus, adapted to transfer of signals between a numerical control apparatus and a machine side controlled by means of the numerical control apparatus.

BACKGROUND OF THE RELATED ART

In order to drive a machine tool by means of a numerical control apparatus, it is necessary to transfer signals between the numerical control apparatus and the machine side. This signal transfer is carried out by means of wires, such as cables, that are connected between the numerical control apparatus and input/output terminals on the machine side. In general, the connection between the numerical control apparatus and the machine side varies depending on various conditions, such as the type and scale of a machine in a system of the machine side. Conventionally, therefore, a distribution board and an I/O unit are employed for facilitating the connections with cables and the like to the machine-side system. In such a case, the distribution board is manufactured for each machine so that it can fit the machine to be controlled by means of the numerical control apparatus, while, for the I/O unit, commonly available is used.

FIG. 3 is a block diagram for illustrating the connection between a conventional numerical control apparatus and a machine side. Referring to FIG. 3, an I/O unit 24 and a distribution board 23 are arranged between a numerical control apparatus 21 and a machine side 22, and are connected by means of cables 31, 32, 33 and 34. The distribution board 23 is set corresponding to the machine-side system 22.

The I/O connection between the conventional numerical control apparatus and the machine side has problems in terms of operating efficiency and productivity.

In making the I/O connection between the conventional numerical control apparatus and the machine side, the distribution board 23 is set singly corresponding to the system of the machine side 22, as shown in FIG. 3, for example. Moreover, on the machine side of the I/O unit 24, the I/O unit 24 and the machine side 22 require at least two cables (wires 32 and wires 33 and 34) between themselves and the distribution board 23. Accordingly, the distribution board 23 must be set corresponding to the machine-side system, and the number of cables for the connection to the distribution board 23 has to be increased, so that it is difficult to improve the operating efficiency and productivity of the distribution board.

In the case where the volume of signals between the numerical control apparatus 21 and the machine side 22 is increased, as shown in FIG. 4, it becomes necessary to use two distribution boards (23a and 23b) and additional I/O units 24a and 24b corresponding to the distribution boards 23a and 23b. These distribution boards and I/O units must be manufactured independently corresponding to the arrangement of the machine side 22, and the number of cables for the connection between them increases accordingly.

By manufacturing the I/O units of the numerical control apparatus adapting to the machine side 22, the distribution boards themselves may be omitted to prevent the increase in the number of cables attributable to the increase of the distribution boards. In this case, however, an I/O unit must be manufactured for each of different machine tools. In general, however, an I/O unit requires a communication circuit, which transmits and receives signals to and from the body of the numerical control apparatus itself, and a transmitter-receiver circuit, which transmits and receives signals to and from the machine side. Thus, providing these circuits for each of different machine tools entails high manufacturing and operating costs.

SUMMARY OF THE INVENTION

The object of the present invention is to provide I/O units and a distribution board for numerical control apparatus, the I/O units and the distribution board being formed integrally without using wires between the I/O units and the distribution board, so that packaging spaces and the number of wires are reduced.

In order to achieve the above object, in an I/O unit and a distribution board for numerical control apparatus according to the present invention, the distribution board has wirings manufactured in conformity to a machine-side system controlled by means of a numerical control apparatus and is provided with connectors detachably mounting a plurality of I/O units each including transmitter-receiver means, and the I/O units are designed so as to be able to be attached to the connectors of said distribution board. When the I/O units are attached individually to one or more of the connectors on the distribution board, the attached I/O units and the wires are connected, whereby input/output connection between the numerical control apparatus and the machine side is accomplished.

As described above, according to the present invention, the I/O units and the distribution board are formed integrally without using wires between the I/O units and the distribution board, so that packaging spaces and the number of wires are reduced, resulting in improvement in costs and operating efficiency.

DESCRIPTION OF THE PREFERRED EMBODIMENTS

Figure 1:
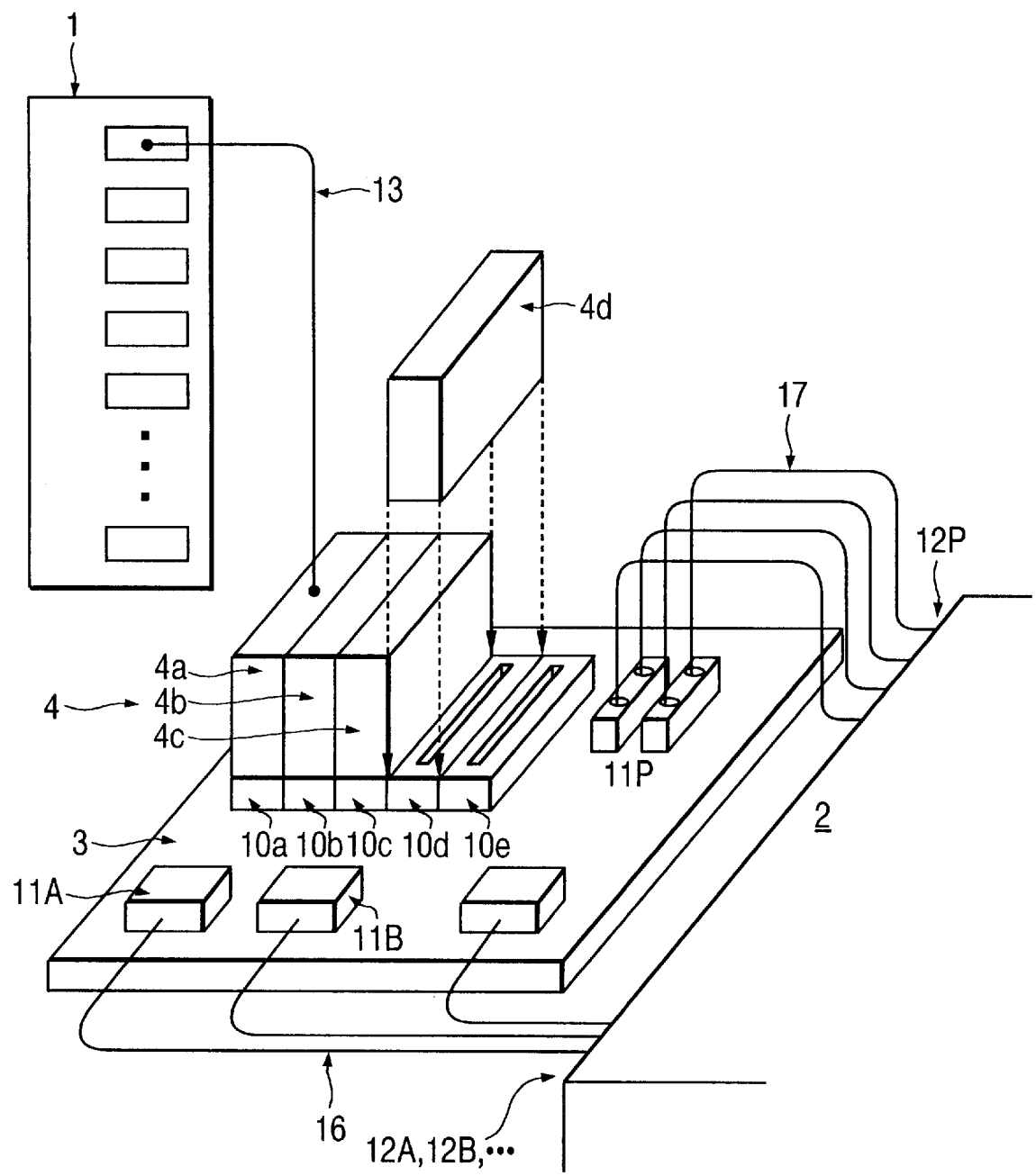
FIG. 1 is a perspective view for schematically illustrating an embodiment of I/O units for numerical control apparatus according to the present invention.

Referring first to FIG. 1, an embodiment of the present invention will be described.

In FIG. 1, I/O units 4 and a distribution board 3 for numerical control apparatus according to the present invention are apparatuses for connecting the body of a numerical control apparatus 1 and a machine side 2 including a console panel, heavy-current panel, etc.

The I/O units 4 for numerical control apparatus are composed of an I/O unit 4a, which is connected to the numerical control apparatus 1 by means of a cable 13, and extended I/O units 4b, 4c, 4d, . . . , the number of which can be varied. On the other hand, the distribution board 3 is provided with wiring (not shown) corresponding to the machine side 2, and is provided with the I/O units 4, which can be connected to the wiring. One-side ends of the wirings are connected individually to connectors 10 (10a, 10b, 10c, 10d and 10e) for connection with the I/O units 4, and the connections among the I/O units 4 and the connectors 10a, 10b, 10c, 10d and 10e can be made, for example, by inserting contact terminals of the I/O units 4 into slots of the connectors 10. The other-side ends of the wirings are further connected to cable connectors 11A, 11B, . . . , 11P, and are connected to connectors 12A, 12B, . . . , 12P on the machine side 2 through cables 16 and 17. The cables 16 include signal lines, through which signals such as stop signals, display signals, etc. are transmitted from the machine side 2 to the side of the distribution board 3, and signal lines, through which signals such as position data are transferred between the side of the distribution board 3 and the machine side 2, while the cables 17 include only signal lines through which the signals such as the stop signals, display signals, etc. are transmitted from the machine side 2 to the side of the distribution board 3.

Referring to FIG. 1, the numerical control apparatus 1 and the distribution board 3 are connected to each other by attaching at least one I/O unit 4a for numerical control apparatus to the connector 10a on the side of the distribution board 3. With this arrangement, the numerical control apparatus 1 and the I/O unit 4a can communicate with each other by means of a cable 13, signals and data are transferred between the I/O units 4 and input/output terminals of the distribution board 3 by means of the wirings of the distribution board 3, and moreover, signals and data are transferred between the input/output terminals of the distribution board 3 and the machine side 2 by means of the cables 16 and 17.

The distribution board 3 can be provided with a plurality of connectors 10a, 10b, 10c, 10d, . . . , and the I/O units 4a, 4b, 4c, 4d, . . . can be mounted on the, connectors, individually. The volumes of transmission and reception which individual I/O units 4 can deal with are set in advance, and the number of I/O units are increased or decreased depending on the volumes of transmission and reception required by the numerical control apparatus 1 and the machine side 2. Signals can be transferred between the individual I/O units 4 through the cables or connectors, but they may alternatively be transferred through the wiring provided on the side of the distribution board 3.

Therefore, in the case where the required volumes of transmission and reception are within the transmission and reception capacity of one I/O unit, the numerical control apparatus 1 and the distribution board can be connected to each other by fitting the connector 10a with the I/O unit 4a to which the cable 13 is connected. In the case where the required volumes of transmission and reception are increased, the I/O units 4b, 4c, 4d, . . . , corresponding in number to the increased volumes of transmission and reception, are attached to the connectors 10b, 10c, 10d, . . . in addition to the I/O unit 4a.

Figure 2:
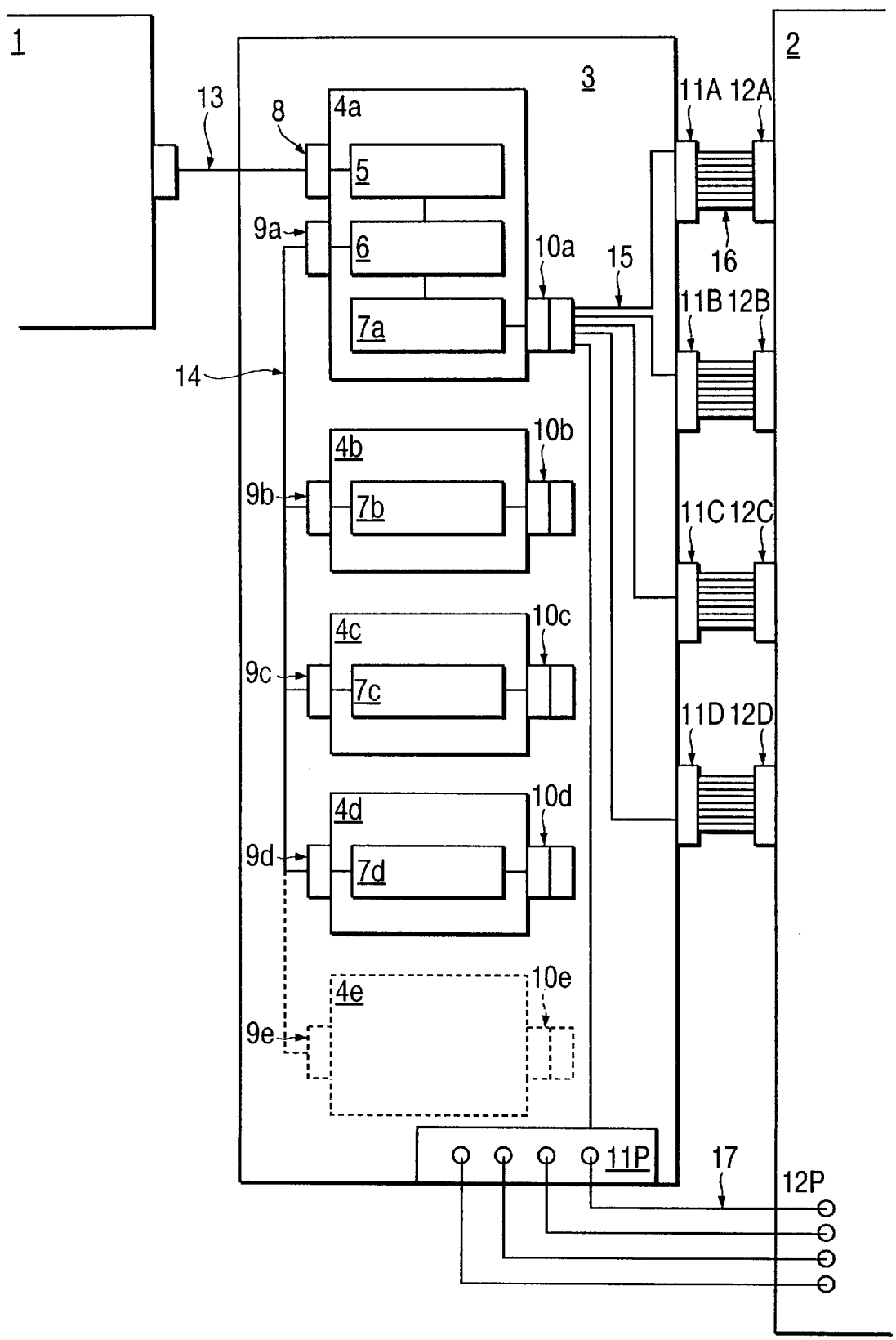
FIG. 2 is a block diagram for illustrating in detail the I/O units for numerical control apparatus shown in FIG. 1.
Figure 3:
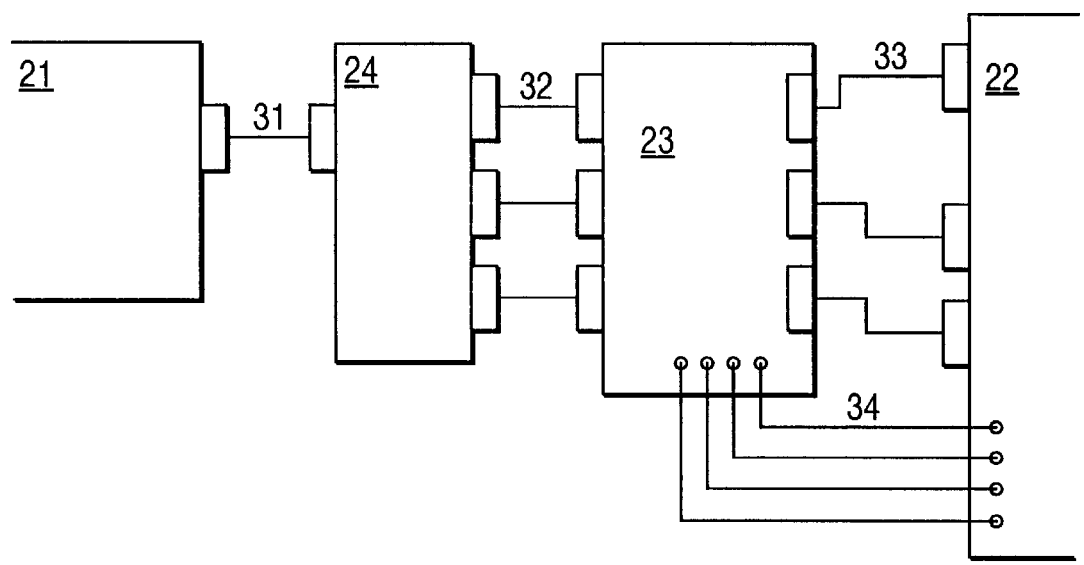
FIG. 3 is a block diagram for illustrating an example of a conventional I/O unit for numerical control apparatus.
Figure 4:
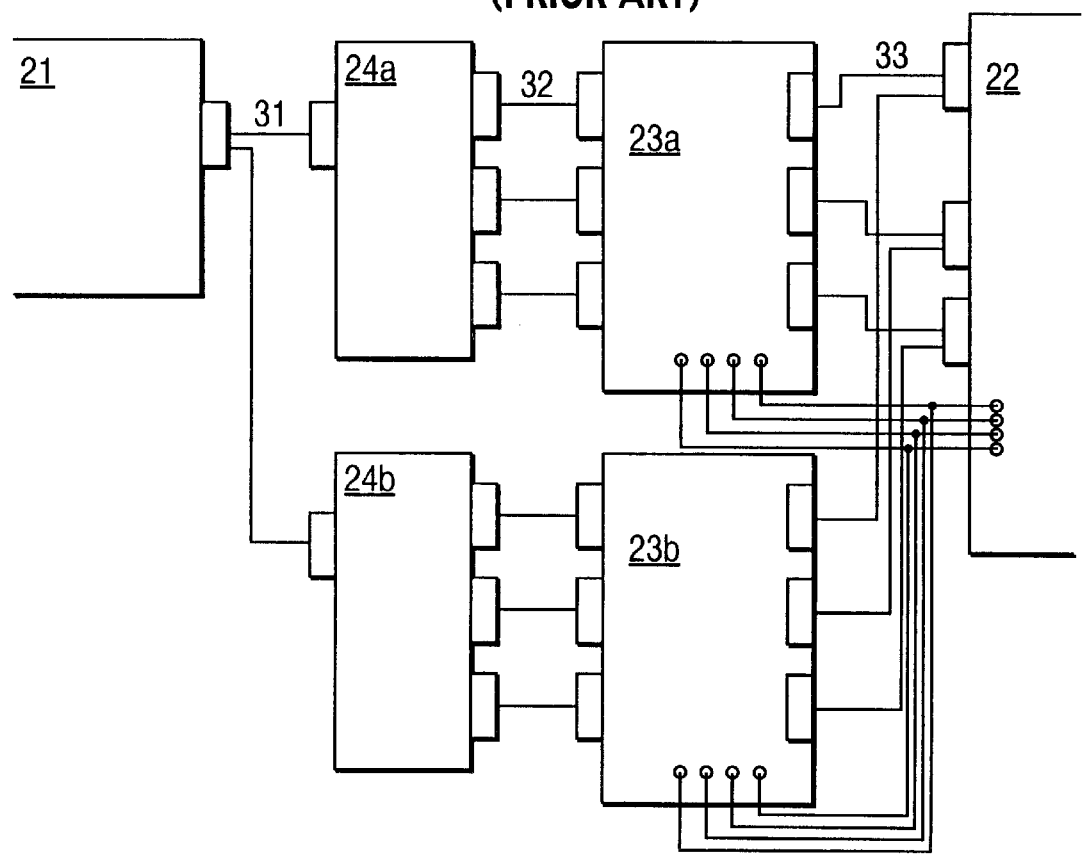
FIG. 4 is a block diagram for illustrating the connection between a conventional numerical control apparatus and a machine side.

Referring now to the block diagram of FIG. 2 showing an embodiment of the present invention, the details and operation of the embodiment of the present invention will be described. Explanation of those components in FIG. 2 which have already been explained in FIG. 1 are not repeated.

Referring to FIG. 2, the distribution board 3 is provided with wirings 15 according to the machine side 2, and input/output terminals of the wirings 15 on one side are connected individually to the connectors 11A, 11B, . . . , 11P. Further, the other-side input/output terminals of wirings 15 are connected to the connectors 10a, 10b, 10c, 10d and 10e for the I/O units 4, individually. The wirings 15 are provided corresponding to different machine sides 2. FIG. 2 schematically shows only those wirings which are connected to the connector 10a.

The connectors 10a, 10b, 10c and 10d of the distribution board 3 are fitted with the I/O units 4a, 4b, 4c and 4d, respectively. The I/O unit 4a is provided with a communication circuit 5, an input/output signal control circuit 6 (illustrated as a control circuit 6), and a transmitter-receiver circuit 7a, while other I/O units 4b, 4c and 4d are provided with only transmitter-receiver circuits 7b, 7c and 7d, respectively. The communication circuit 5 of the I/O unit 4a enables the distribution board 3 and the numerical control apparatus 1 to communicate with each other through the cable 13 and a connector 8. The input/output signal control circuit 6 directly controls the transmitter-receiver circuit 7a of the I/O unit 4a and controls the respective transmitter-receiver circuits 7a, 7b, 7c and 7d of the I/O units 4b, 4c and 4d through connectors 9a, 9b, 9c and 9d, a wiring 14, etc., thereby regulating the transmission and reception operations of the transmitter-receiver circuits. These transmitter-receiver circuits 7a, 7b, 7c and 7d transmit and receive control signals and data signals to and from the machine side 2 through the wires 15 and the cables 16 and 17.

Thus, only the I/O unit 4a is provided with the communication circuit 5 and the input/output signal control circuit 6, while other additional I/O units 4b, 4c and 4d are provided with only the transmitter-receiver circuits 7b, 7c and 7d.

Regarding the transmitting and receiving capacities of the respective transmitter-receiver circuits 7a, 7b, 7c and 7d of the I/O units 4, if it is assumed that the numbers of connectable points on the input side and output side are 16 and 8, respectively, for example, then the numbers of connectable points available on the input side and output side of the four I/O units 4a, 4b, 4c and 4d, indicated by solid lines in FIG. 2, are 64 (16 points×4 units) and 32 (8 points×4 units), respectively.

If a machine tool controlled by the numerical control apparatus requires 60 points for the input side and 30 points for the output side, in this case, numerical control can be carried out through connections for transmission and reception with this arrangement of the distribution board 3 that includes the I/O units 4a, 4b, 4c and 4d.

In the case where the machine tool controlled by means of the numerical control apparatus requires more input and output points, an I/O unit 4e is additionally attached to the distribution board 3, as indicated by broken line in FIG. 2, so that it receives control signals and data signals from the input/output signal control circuit 6 through the wiring 14 and a connector 9e, whereby the numbers of available input and output points can be increased to maximum numbers to which the input/output signal control circuit 6 corresponds. These numbers of input and output points can be increased for each of the I/O units having the common construction.

The cables 16 are used to transfer transmission and reception signals between the machine side 2 and the side of the distribution board 3, while the cables 17 are used only for the transmission from the machine side 2 to the side of the distribution board 3. On the machine side 2, the cables 16 and 17 are connected to the connectors 12A, 12B, 12C, 12D and 12P, individually. If the machine tool controlled by means of the numerical control apparatus requires 60 points for the input side and 30 points for the output side, in this case, connectors 12A, 12B and 12C having 16 points at input side and 8 point at output side, connector 12D having 8 points at input side and 6 points at output side, and the connector 12P having 4 points at input side may be combined for use, for example.

Thus, in carrying out machining based on numerical control by using the I/O units and the distribution board for numerical control apparatus according to the present invention, it is necessary only to design and provide wirings of distribution board in conformity to the system of machine side and determine the number of I/O units for input and output operations. By doing so, wiring between I/O units and distribution board can be eliminated, so that operation for wiring arrangement can be omitted to improve the operating efficiency and productivity and lower the manufacturing costs.

Furthermore, according to the I/O units and the distribution board for numerical control apparatus of the present invention, the I/O units and the distribution board can be formed integrally with one another, so that packaging spaces and the number of wires can be reduced.

I claim:

1. An I/O unit carrying out signal intermediation between a numerical control apparatus and a machine tool, said I/O unit comprising:
   a connector connected to the numerical control apparatus; and
   connectors transmitting and/or receiving signals, and provided for transmitting an input signal to, or receiving an output signal from, the machine tool, wherein said connectors are connected, through a distribution board adapted to the machine tool, and are directly connected to I/O mounting connectors provided on the distribution board.

2. An apparatus comprising:
   a distribution board comprising:
      wiring adapted to a machine tool,
      I/O unit mounting connectors coupled to one end of the wiring, and
      a cable connecting connectors adapted to the machine tool and connected to the other end of the wiring; and
   an I/O unit comprising
      a transmitter-receiver circuit, wherein the distribution board is provided between the I/O unit and the machine tool and the I/O unit mounting connector detachably receives the I/O unit.

3. An I/O unit coupled to a distribution board including connectors and to a numerical control apparatus through a cable, said I/O unit comprising:
   a communication circuit coupled to the cable; and
   a transmitter-receiver circuit attached to one of the connectors of the distribution board, said distribution board coupled to the numerical control apparatus, said I/O unit coupled to the distribution board through the transmitter-receiver circuit and the one of the connectors and to the numerical control apparatus through the communication circuit and the cable, wherein said transmitter-receiver circuit transmits and receives control signals and data signals to and from a machine tool through wiring provided on the distribution board and connecting cables,
   said I/O unit further comprising an input/output signal control circuit being adapted to directly control the transmitter-receiver circuit of the I/O unit corresponding thereto and to control transmitter-receiver circuits provided in other I/O units, attached to I/O unit connectors of the distribution board, through the connectors and wiring.

4. An apparatus according to claim 2, wherein said transmitter-receiver circuit transmits and receives control signals and data signals to and from the machine tool through wiring provided on the distribution board and connecting cables.

5. An apparatus coupled to a numerical control apparatus and to a machine tool and comprising:
   a distribution board coupled to the numerical control apparatus, said distribution board comprising connectors coupling the distribution board to the machine tool apparatus; and
   I/O units, coupled to the distribution board and to the numerical control apparatus, said distribution board, each of said I/O units including a transmitter-receiver circuit, and one of said I/O units comprising a communication circuit adapted for input/output connection between the numerical control apparatus and the machine tool, wherein:
      said distribution board includes connectors including wiring conforming to the machine tool controlled by the numerical control apparatus, said wiring provided with connectors removably attaching the I/O units;
      said transmitter-receiver circuits being attached to the connectors of said distribution board; and
      when said I/O units are attached to one or more of the connectors on the distribution board, respectively, the attached I/O units are connected to said wiring.

6. An I/O unit according to claim 1, wherein said I/O unit includes a communication circuit connected to the numerical control apparatus.

7. An I/O unit according to claim 1, wherein said I/O unit is connected to another I/O unit through the transmitter-receiver circuit.

8. An I/O unit according to claim 1, wherein said I/O unit comprises an I/O signal control circuit, and said I/O signal control circuit controls said transmitter-receiver circuit.

9. An apparatus coupled to a numerical control apparatus and to a machine tool and comprising:
   a distribution board coupled to the machine tool; and
   I/O units, formed integrally with the distribution board and coupled to the numerical control apparatus, each of said I/O units including a transmitter-receiver circuit, and one of said I/O units comprising a communication circuit adapted for input/output connection between the numerical control apparatus and the machine tool, wherein:
      said distribution board comprises connectors connecting the distribution board to the machine tool;
      said I/O units include a plurality of data input terminals and a plurality of data output terminals;
      said distribution board includes a plurality of I/O unit connectors removably attaching said plurality of I/O units, a plurality of cable connectors, and wiring connecting the I/O unit connectors and the cable connectors; and
      a necessary number of I/O units are connected to the I/O unit connectors of said distribution board, depending on a corresponding, necessary number of input and output points for the machine tool to be controlled by the numerical control apparatus and the transmitting and receiving capacities of said I/O units.

10. An apparatus according to claim 9, wherein one of said I/O units attached to the I/O unit connectors of the distribution board comprises a communication circuit communicating with the numerical control apparatus, an input/output control circuit controlling transmitter-receiver circuits of the rest of I/O units, and a transmitter-receiver circuit, and each of other I/O units comprises only the transmitter-receiver circuit.

* * * * *